US009832424B2

(12) United States Patent
Riley et al.

(10) Patent No.: US 9,832,424 B2
(45) Date of Patent: Nov. 28, 2017

(54) METHOD AND SYSTEM FOR MANAGING CONTENT LIFECYCLE IN A CONTENT PROCESSING SYSTEM

(75) Inventors: Xavier D. Riley, Los Angeles, CA (US); Sonam N. Parikh, Redondo Beach, CA (US); Ksatria G. Williams, Garden Grove, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 958 days.

(21) Appl. No.: 11/828,292

(22) Filed: Jul. 25, 2007

(65) Prior Publication Data

US 2009/0031364 A1 Jan. 29, 2009

(51) Int. Cl.
H04N 7/16 (2011.01)
H04N 7/20 (2006.01)
H04N 7/18 (2006.01)
H04N 7/173 (2011.01)
H04N 21/231 (2011.01)
H04N 21/254 (2011.01)
H04N 21/8355 (2011.01)
H04N 21/23 (2011.01)

(52) U.S. Cl.
CPC ........... *H04N 7/17318* (2013.01); *H04N 7/20* (2013.01); *H04N 21/23113* (2013.01); *H04N 21/2541* (2013.01); *H04N 21/8355* (2013.01); H04N 21/23 (2013.01)

(58) Field of Classification Search
CPC ...... H04N 21/00; H04N 21/23; H04N 21/231; H04N 21/23113
See application file for complete search history.

(56) References Cited

U.S. PATENT DOCUMENTS

| 6,401,243 | B1 | 6/2002 | Suzuki |
| 6,557,171 | B1 | 4/2003 | Sonoda et al. |
| 6,584,083 | B1 | 6/2003 | Toporek et al. |
| 6,772,209 | B1 * | 8/2004 | Chernock et al. ............ 709/225 |
| 6,774,926 | B1 | 8/2004 | Ellis et al. |
| 7,103,906 | B1 | 9/2006 | Katz et al. |
| 7,197,088 | B1 | 3/2007 | Yukawa |
| 7,277,870 | B2 | 10/2007 | Mourad et al. |
| 7,394,779 | B2 | 7/2008 | Seo et al. |
| 7,496,092 | B2 | 2/2009 | Wilson |

(Continued)

FOREIGN PATENT DOCUMENTS

| EP | 1202507 A | 5/2002 |
| WO | 0169868 A | 9/2001 |

OTHER PUBLICATIONS

Notice of Allowance dated Feb. 8, 2013 in U.S. Appl. No. 11/828,534, filed Jul. 26, 2007 by Xavier D. Riley.

(Continued)

*Primary Examiner* — James R Marandi
(74) *Attorney, Agent, or Firm* — Harness, Dickey & Pierce, PLC

(57) ABSTRACT

A communication system 100 is used to manage content. The content is transferred to a content delivery network 280. The content has publication start time and a purge time associated therewith. The content start time and purge time may be provided in the metadata associated with the content. The system publishes the content according to a publication start time and purges the content from the content delivery network at the purge time.

30 Claims, 8 Drawing Sheets

(56) References Cited

U.S. PATENT DOCUMENTS

| | | |
|---|---|---|
| 7,646,768 B2 | 1/2010 | Coupe et al. |
| 7,778,875 B2 | 8/2010 | Schauser et al. |
| 7,873,072 B2 | 1/2011 | Kim et al. |
| 2001/0004769 A1 | 6/2001 | Simon |
| 2002/0023268 A1 | 2/2002 | LaRocca et al. |
| 2002/0059621 A1 | 5/2002 | Thomas et al. |
| 2002/0064189 A1 | 5/2002 | Coupe et al. |
| 2002/0067745 A1 | 6/2002 | Coupe et al. |
| 2002/0184649 A1 | 12/2002 | Wilson |
| 2003/0063607 A1 | 4/2003 | Adachi et al. |
| 2003/0066085 A1 | 4/2003 | Boyer et al. |
| 2003/0093806 A1 | 5/2003 | Dureau et al. |
| 2003/0121047 A1 | 6/2003 | Watson et al. |
| 2004/0019900 A1 | 1/2004 | Knightbridge et al. |
| 2004/0120349 A1 | 6/2004 | Border et al. |
| 2005/0013262 A1 | 1/2005 | Zein Al-Abedeen et al. |
| 2005/0216952 A1 | 9/2005 | Johnson |
| 2005/0265547 A1 | 12/2005 | Strasser et al. |
| 2006/0153104 A1 | 7/2006 | Lee et al. |
| 2006/0209709 A1 | 9/2006 | Kovacevic |
| 2006/0291803 A1 | 12/2006 | Watson et al. |
| 2007/0011709 A1 | 1/2007 | Katz et al. |
| 2007/0283449 A1 | 12/2007 | Blum et al. |
| 2008/0022347 A1 | 1/2008 | Cohen |
| 2008/0137847 A1 | 6/2008 | Candelore et al. |
| 2008/0141303 A1 | 6/2008 | Walker et al. |
| 2008/0226073 A1 | 9/2008 | Hawkes et al. |
| 2009/0029644 A1 | 1/2009 | Sue et al. |
| 2009/0031370 A1 | 1/2009 | Riley et al. |
| 2010/0189254 A1 | 7/2010 | Candelore et al. |

OTHER PUBLICATIONS

Non-final Office action dated Dec. 20, 2011 in U.S. Appl. No. 11/828,534, filed Jul. 26, 2007 by Xavier D. Riley.
Final Rejection dated Jun. 5, 2012 in U.S. Appl. No. 11/828,534, filed Jul. 26, 2007 by Xavier D. Riley.
Non-final Office action dated Jun. 22, 2011 in U.S. Appl. No. 11/828,534, filed Jul. 26, 2007 by Xavier D. Riley.
Non-final Office action dated Jul. 21, 2010 in U.S. Appl. No. 11/782,554, filed Jul. 24, 2007 by Ranny Q. Sue et al.
Final Rejection dated Jan. 5, 2011 in U.S. Appl. No. 11/782,554, filed Jul. 24, 2007 by Ranny Q. Sue et al.
Final Rejection dated Oct. 28, 2015 in U.S. Appl. No. 11/782,554, filed Jul. 24, 2007 by Ranny Q. Sue et al.
Non-final Office action dated Jun. 3, 2015 in U.S. Appl. No. 11/782,554, filed Jul. 24, 2007 by Ranny Q. Sue et al.

* cited by examiner

METHOD AND SYSTEM FOR MANAGING CONTENT LIFECYCLE IN A CONTENT PROCESSING SYSTEM

TECHNICAL FIELD

The present disclosure relates to a content processing and delivery system and, more specifically, to a system for managing the lifecycle of content within the system.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

Content providers are increasingly trying to determine additional ways to provide content to users. Some content may be desired by a small number of customers. In such a case using valuable satellite resources at peak viewing times may not be cost effective. Less popular content may be broadcast by satellite at less popular viewing times, or may be available for downloading on demand via a broadband connection. Such content may be received and stored by a digital video recorder for later viewing.

SUMMARY

The present disclosure allows files to be easily managed within the system based upon various times, including a publication start time, a publication end time, and a purge time.

In one aspect of the disclosure, a method includes transferring content to a content delivery network. The content has a publication start time and a purge time. In a further aspect of the invention, a method includes publishing the content according to a publication start time and purging the content from the content delivery network at the purge time.

In a further aspect of the disclosure, a communication system includes a content management system that determines a publication start time and a purge time for the content. The communication system also includes a content repository storing the content and a content delivery network communicating with the content repository. A content distribution system communicates with the content management system and the content delivery network. The content distribution system transfers content to the content delivery network from the content repository. The content delivery network publishes the content according to a publication start time. The content delivery network purges the content at the purge center.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
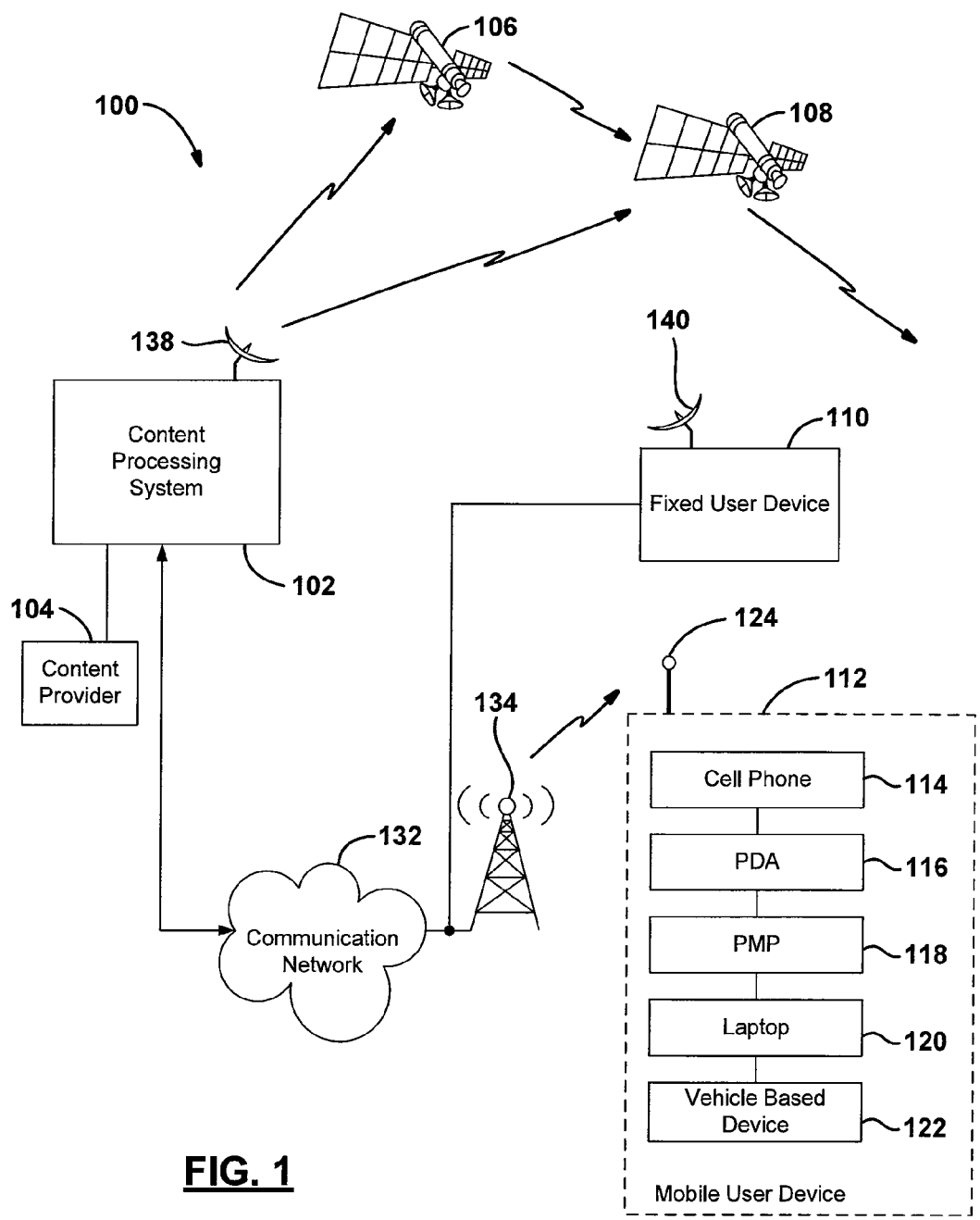
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Information or content provided to content processing system 102 from the media source 104 may be transmitted, for example, via an uplink antenna 138 to the satellite(s) 106,108, one or more of which may be a geosynchronous or geo-stationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset can be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the IRD 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
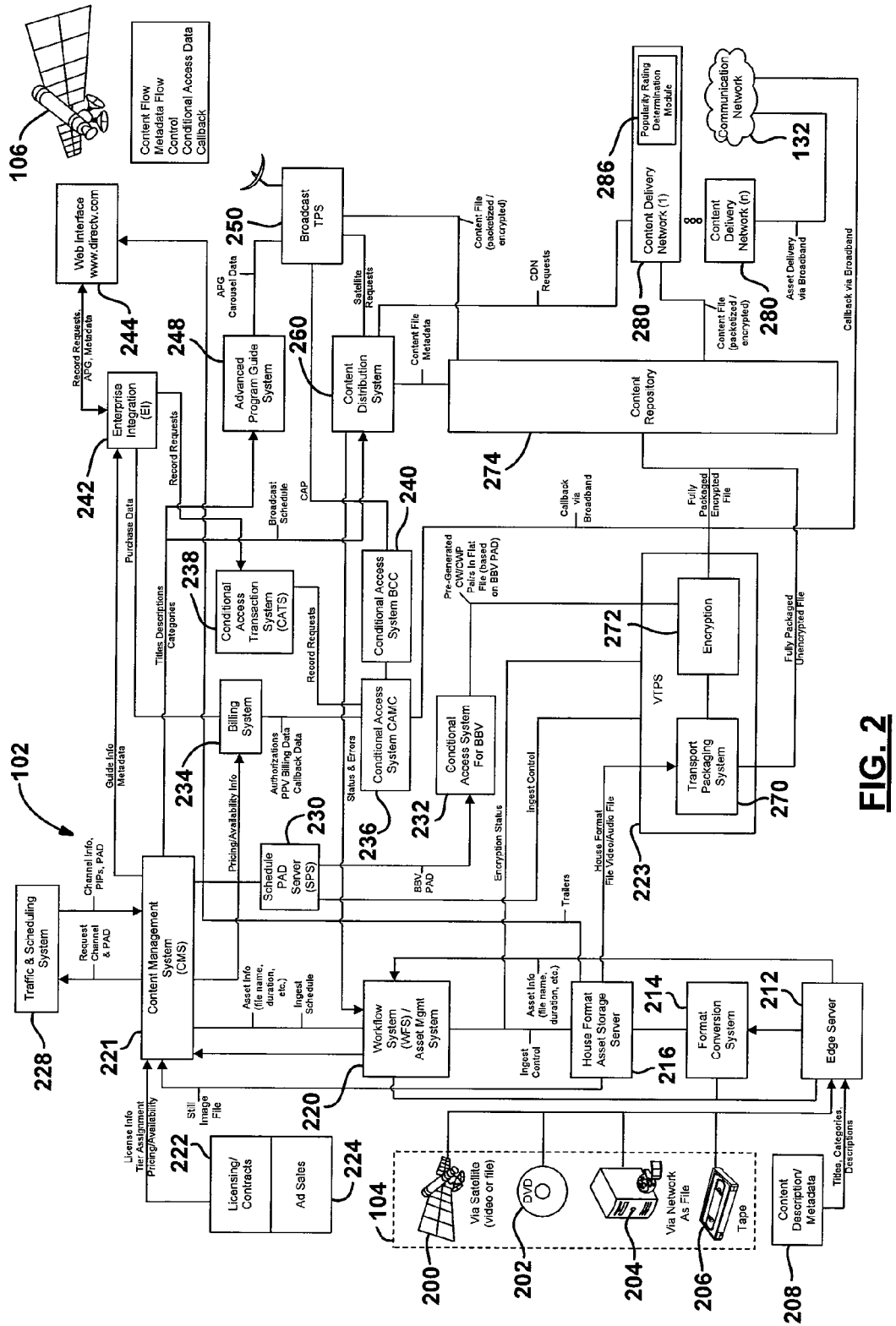
FIG. 2 is a detailed block diagrammatic view of the content processing system of FIG. 2.

Referring now to FIG. 2, the content processing system 102 of FIG. 1 is illustrated in further detail. The content provider 104 may include various types of content providers, including those that provide content by way of a satellite 200, DVD 202, via a network as a file in 204, by way of tapes and other means. The content provider 104 may also provide a content description and other metadata 208 to the system. An input server 212 may receive the various content and associated metadata and convert the format in a format conversion system 214. A house format asset storage server 216 may be used to store the content asset in a house format. Still image files, trailers, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 221 may encode the packet. The encoder may encode the data according to the CableLabs® Video-on-Demand (VoD) encoding specification MD-SP-VOD-CEP-I01-040107 (i.e., performs asset encoding). The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

A traffic and scheduling system 228 is used to provide the requested channel, program associated data (PAD), channel information and program information packets (PIPs). The traffic and scheduling system 228 may schedule content processing for a plurality of received assets based on a desired program lineup to be offered by the communication system 100. For example, a live TV program for which a high demand for reruns might be expected could be assigned a high priority for content processing.

A schedule PAD server (SPS) 230 may be coupled to the workflow system and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Record requests may also be provided from the conditional access transaction system 238. A conditional access system BCC 240 may be used to generate a conditional access packet from the information from the conditional access system 236.

The billing system 234 may generate purchase data that is provided to the enterprise integration (EI) block 242. The enterprise integration block 242 may generate record requests to the conditional access transaction system 238. Record requests may be generated through a web interface such as DIRECTV.com® in block 244. Various ordering information, such as ordering broadband video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Titles, description and various categories from the content management system 221 may be provided to the advanced program guide system 248. The program guide system 248 may be coupled to a satellite broadcasting system such as a broadcast transport processing system 250 that broadcasts content to the users through the satellite 106, 108.

The program guide data generated by the program guide system 248 may include information that is used to generate a display of guide information to the user, wherein the program guide may be a grid guide and informs the user of particular programs that are broadcast on, particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Titles, descriptions and categories may also be provided from the content management system 221 to the content distribution system 260. Content files and metadata may be controlled by the content distribution system 260.

Referring back to the video transport processing system 227, the video transport processing system 223 includes a transport packaging system 270. The transport packaging system 270 creates pre-packetized unencrypted files that are stored in the content repository 274. An encryption module 272 receives the output of the transport packaging system and encrypts the packets. Fully packaged and encrypted files may also be stored in the content repository 274. Encryption may take place in the data portion of a packet and not the header portion.

One or more content delivery networks 280 may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hyper text transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

Security of assets available by way of the content delivery network may also be established. Control word packets for each broadcast-encrypted asset or content file may be provided to the content delivery network. Encryption may also be provided.

The broadcast transport processing system 250 may provide various functions, including encoding, packetizing, encrypting, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, asset files, etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though the at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

Figure 3:
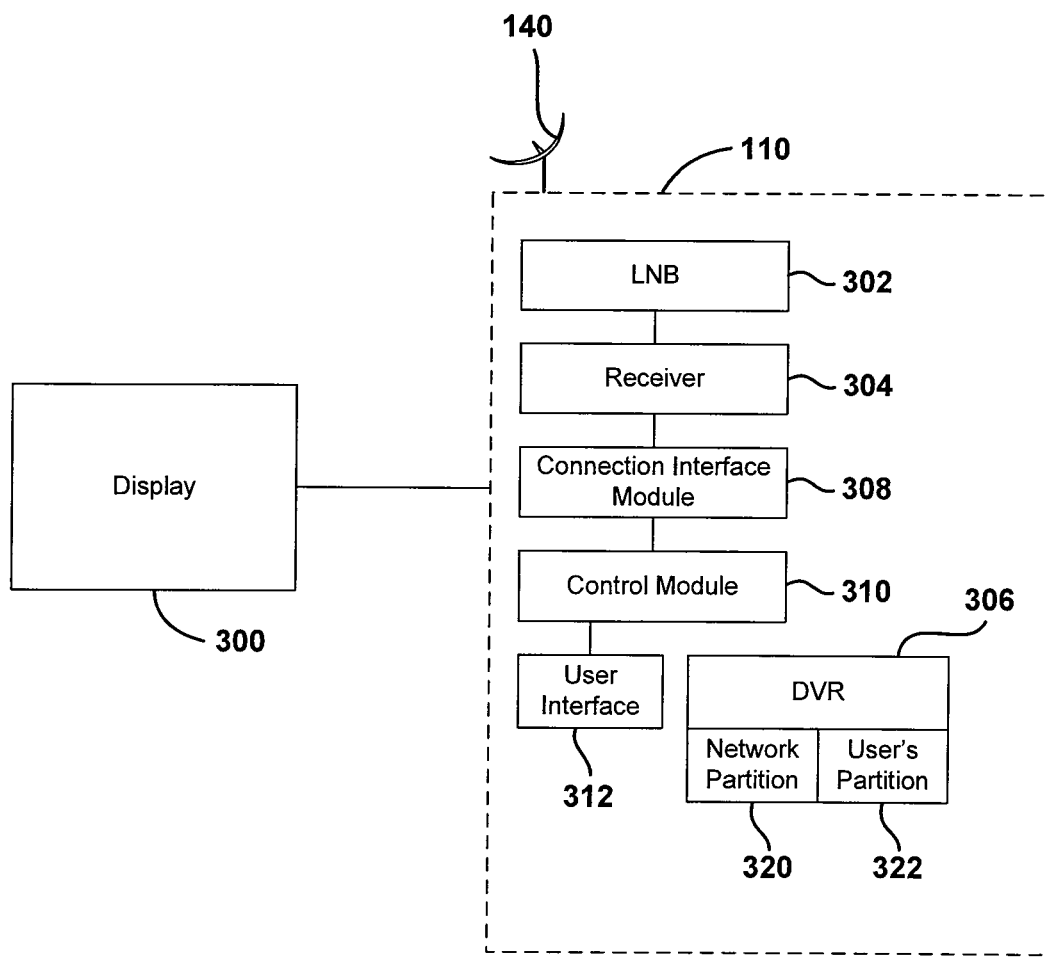
FIG. 3 is a detailed block diagrammatic view of the fixed user device of FIG. 1.

Referring now to FIG. 3, the user device 110 may be one of any variety of devices, for example, a set-top box, a home media server, a home media center (HMC), a personal computer (PC) having a receiver card installed therein, etc. A display device 300 such as a television set, a computer monitor, a portable media player or the like may be coupled to the user device. The user device 110 may be an integrated receiver decoder, a satellite television receiver or the like for displaying and/or playback of received programming.

The receive antenna 140 (124 on a mobile device) receives signals conveying a modulated multiplexed bitstream from the satellites 106, 108. Within the receive antenna 140, the signals are coupled from a reflector and feed to a low-noise block (LNB) 302, which amplifies and frequency downconverts the received signals. The LNB 302 output is then provided to a receiver 304, which receives, demodulates, depacketizes, demultiplexes, decrypts and decodes the received signal to provide audio and video signals to the display device 300 or a recorder 306, or both. The memory device 306 may be implemented separately from or within the user device 110. The receiver 304 is responsive to user inputs to, for example, tune to a particular program.

To store received and/or recorded programs and/or assets, the memory device 306 may include any of a variety of storage devices such as a hard disk drive, DVR, or other types of memory devices. The memory device 306 may be used to store the packetized assets and/or programs received via the satellites 106, 108 and/or the CDN 280. In particular, the packets stored on memory device 306 may be the same encoded and, optionally, encrypted packets created by the content processing system 102 and transmitted via the satellites 106, 108 and/or made available for download via the CDN 280.

The memory device 306 may also be a device capable of recording information on, for instance, analog media such as videotape or computer readable digital media such as a hard disk drive (HDD), a digital versatile disc (DVD), a compact disc (CD) and/or any other suitable media.

To communicate with any of a variety of clients, media players, etc., the illustrated example the user device 110 includes one or more connection interface modules 308 (e.g., USB, serial port, Firewire, etc.). The connection interface module 306 may act as a network interface that implements, for example, an Ethernet interface.

Each user device 110 may connect to the communication network such as the Internet 122 via any of a variety of technologies, for instance, a voice-band and/or integrated services digital network (ISDN) modem connected to a conventional PSTN, a wireless broadband connection (e.g., IEEE 802.11b, 802.11g, etc.), a broadband wired connection (e.g., ADSL, cable modems, etc.), a wired Ethernet connection (e.g., local area network (LAN), wide area network (WAN), etc.), a leased transmission facility (e.g., a digital signal level 1 circuit (a.k.a. a DS1), a fractional-DS1, etc.), etc.

The user device 110 may also include a control module 310 that is used to control the operation of the various components within the user device.

A user interface 312 may, for example, be a set of push buttons or a remote control interface. The user interface 312 is used to make selections, input various data, and change the parameters of the user device 110. The user interface 312 may be used together with a graphical user interface displayed on the display device associated with the user device.

It should also be noted that the user devices 114 (device 110) may be configured in a similar manner to those illustrated in FIG. 3 through reference number 110. Such devices may include an internal antenna rather than an external dish-type antenna that is illustrated in the fixed device as 140. Also, external antennas are possible such as a phased array antenna.

The recording device 306 may also be partitioned into a network partition 320 and a user partition 322. Different types of content or assets may be stored in the network partition 320 or the user partition 322. The content stored in the different partitions may relate to the tier of the content. This will be further described below.

Figure 4A:
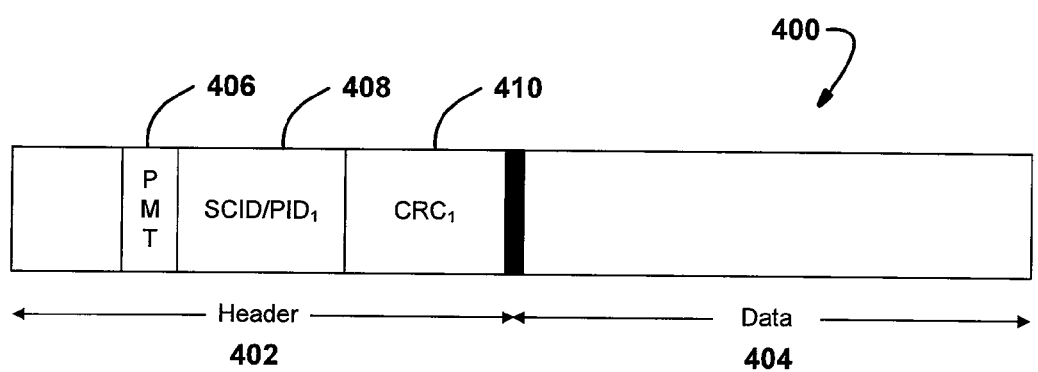
FIGS. 4A and 4B are representational views of packets formed according to the present disclosure.
Figure 4B:
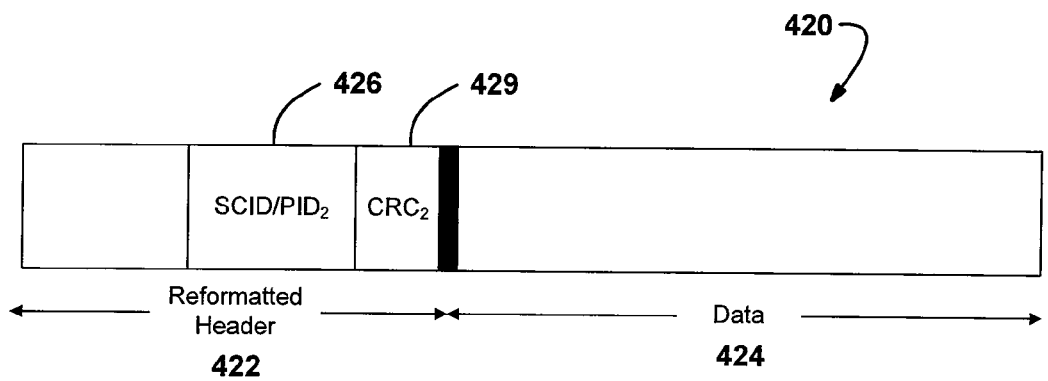

Referring now to FIGS. 4A and 4B, a packet 400 having a header 402 and a data portion 404 is illustrated. The header 402 may include a program map table (PMT) 406, an SCID/PID portion 408, and a cyclic redundancy check portion 410. This is representative of the output of the VTPS and the file stored in the content repository. The data portion 404 may be encrypted or not encrypted, while the header portion 402 is preferably not encrypted. A signal may be broadcast from the content distribution network with this type of format.

In FIG. 4B, a second packet 420 having a reformatted header 422 and a data portion 424 is illustrated. The data portion 424 may be unchanged from data portion 404. The reformatted header 422 includes a second SCID/PID 426 that has been changed. The header 426 of the packet 420 has its identification (SCID/PID) reconfigured so that it may be broadcast by the satellite. Because the SCID/PID is changed, the CRC portion 428 is also changed to conform to this change.

Figure 5:
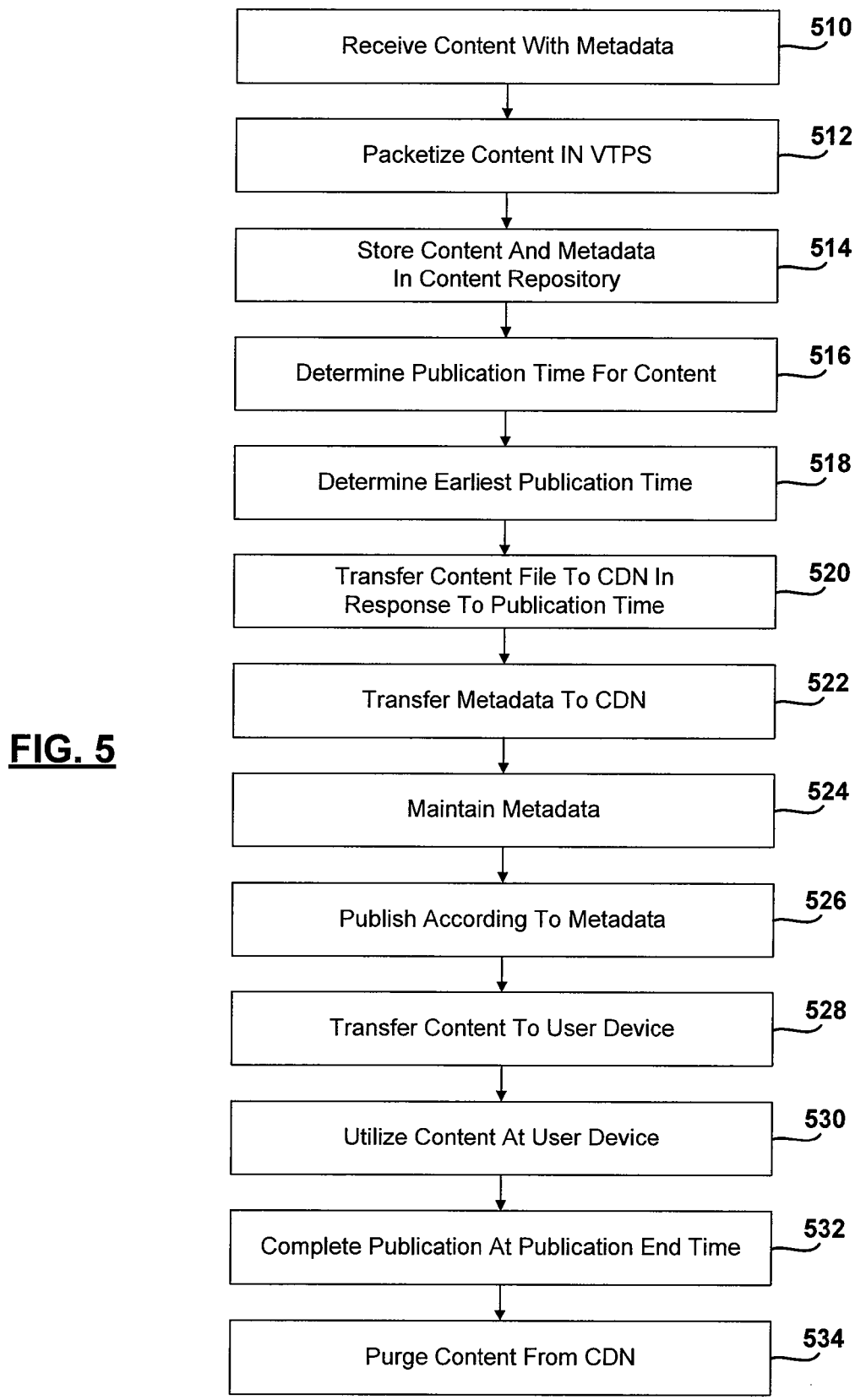
FIG. 5 is a flowchart illustrating a method for publishing and purging content.

Referring now to FIG. 5, a method of operating the communication system is set forth. In this embodiment, the general method for maintaining the files within the system is set forth. In step 510, content with metadata is received in the communication system. As mentioned above, the content provider 104 may provide the content in various forms. In step 512, the content is packetized in the VTPS 223. Also, as mentioned above, the VTPS may also encrypt the packets or at least the data portions of the packets. In step 514, the packets, whether encrypted or not, are stored in the content repository 274. In step 516, a time for publication is determined. The publication time corresponds to the time that the content is available for download by one of the user devices from the content delivery network 280. Various content within the content repository may have different publication times. In step 518, the earliest publication time for the various content is determined. In step 520, the content file is transferred to the content delivery network 280 in response to the publication time. That is, the earliest publication time may be used to transfer content to the content delivery network first. The content may be transferred prior to the publication time so that it is available at the publication time. This is in contrast to a typical satellite broadcasting system and to the broadcast TPS system 250 described in FIG. 2. In a satellite system, the content is broadcast at the air time.

In step 522, metadata corresponding to the content file is transferred to the content delivery network 280. In step 524, the metadata may be changed according to information from the content management system. For example, the publication time, the publication end time, and a purge time may be added to the metadata. In step 526, the content file is published according to the publication time in the metadata. In step 528, the content may be transferred to the user device. In step 530, the user device may utilize the content by viewing the content on the display device. In step 532, publication is complete at the publication end time. In step 534, the content is purged from the content delivery network according to a purge message.

Figure 6:
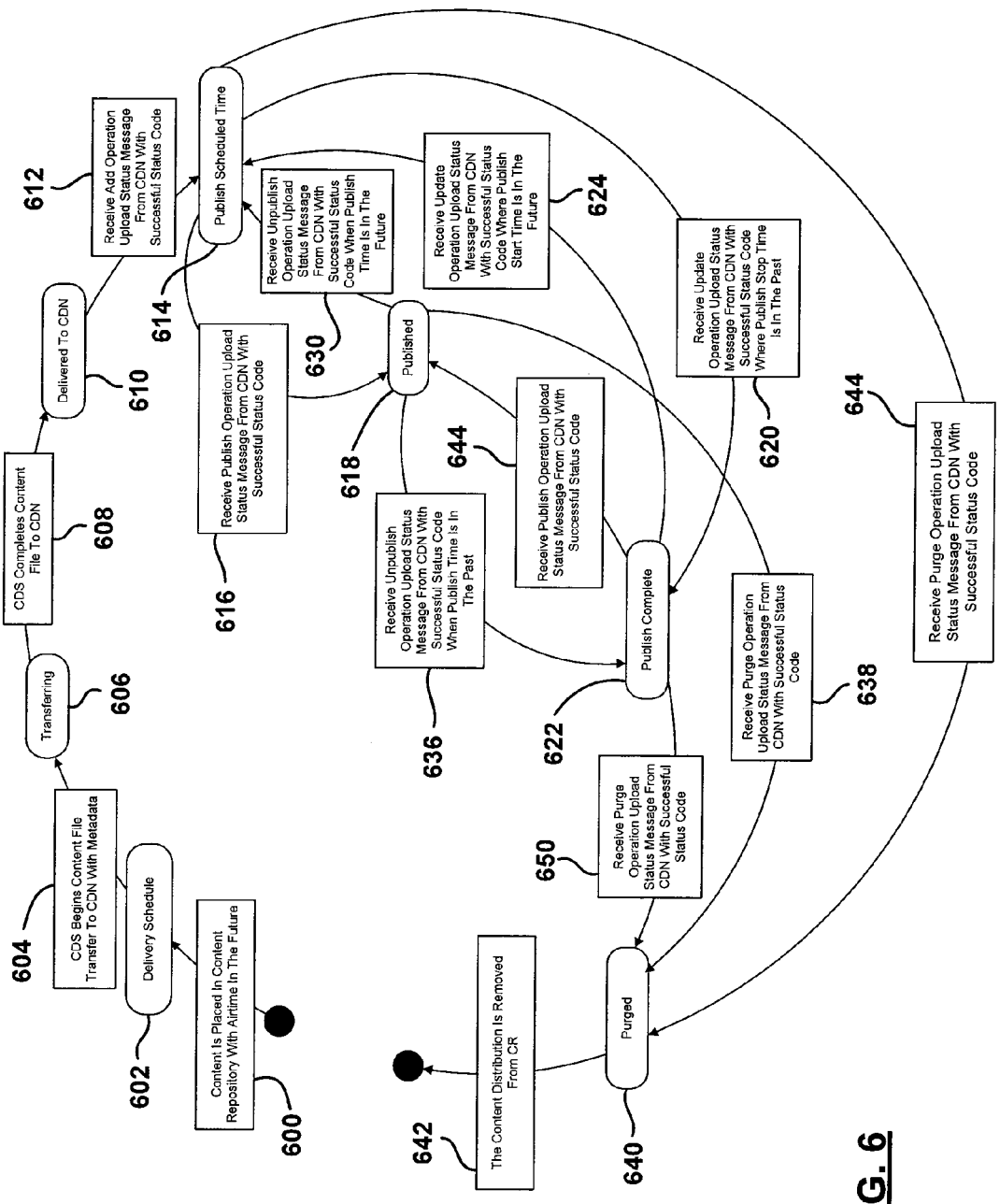
FIG. 6 is a state diagram for publishing and purging content.

Referring now to FIG. 6, a state diagram of the method of FIG. 5 is illustrated. The method begins in step 600 in which the content is placed in the content repository 274 after possible encryption and packetizing from the VTPS 223. In step 602, delivery is scheduled by the content management system 221. The content distribution system 260 begins content file transfer to a content delivery network 280 with metadata in step 604. In step 606, the content with the metadata is transferred. In step 608, the content delivery system completes the content file transfer to the content delivery network 280. In step 610, the content is fully delivered to the content distribution or delivery network 280. In step 612, an add operation is received by the content delivery network. An upload status message from the content delivery network (CDN) with a successful status code is provided. The content delivery network may perform using commands from the content distribution system. These commands may be received all at once in a report or may be received in parts. In one embodiment the report is used to generate the various commands such as publish, purge or publication complete. This "receiving" means that the report may be received and the content delivery network is executing the report by generating and performing the associated commands.

In step 614, publication is scheduled by setting a publication time. After step 614, step 616 may be performed. In step 616, the content delivery network 280 may perform a publish operation. Also in step 616, an upload status message from the content delivery network may be provided to the content distribution system with a successful status code. In step 618, the content is published.

Referring back to step 614, if an update operation message is received or generated and the upload status message from the content delivery network with a successful status code with the published stop time is in the past at 620, step 622 may be performed. Step 622 ends the publication according to the publication stop time.

Referring back to step 614, if a receive update operation is received and an upload status message from the content delivery network has a successful status code where the publish start time is in the future in step 624, step 622 completes the publication.

Referring back to step 618, when the content is published in 618 and an unpublished operation is received with an upload status message from the content delivery network with a successful status code and a published time in the future, step 630 is performed which brings the system back to the published scheduled block 614.

Referring back to step 618, if an unpublished operation message is received in step 636, and the upload status message from the content delivery network with a successful status code has a publication time in the past, step 622 is performed which completes the publication. In step 618, if a purge operation message is received from the content distribution system and the upload status message from the content distribution network with a successful status code is provided in step 638, the content is purged in step 640.

Referring back to step 622, if the publication is complete and a published operation is received with an upload status message from the content delivery network with a successful status code in step 644, the content is again published in step 618.

Referring back to step 622, if the publication is complete and a purge operation upload status message is received from the content delivery network with a successful status code in step 650, step 640 purges the content from the system. In step 642, the content may be removed from the content repository.

Referring back to the publication schedule times block 614, if a receive purge operation is received that blocks and an upload status message from the content delivery network has a successful status code, step 640 is performed in which the content is purged.

Figure 7:
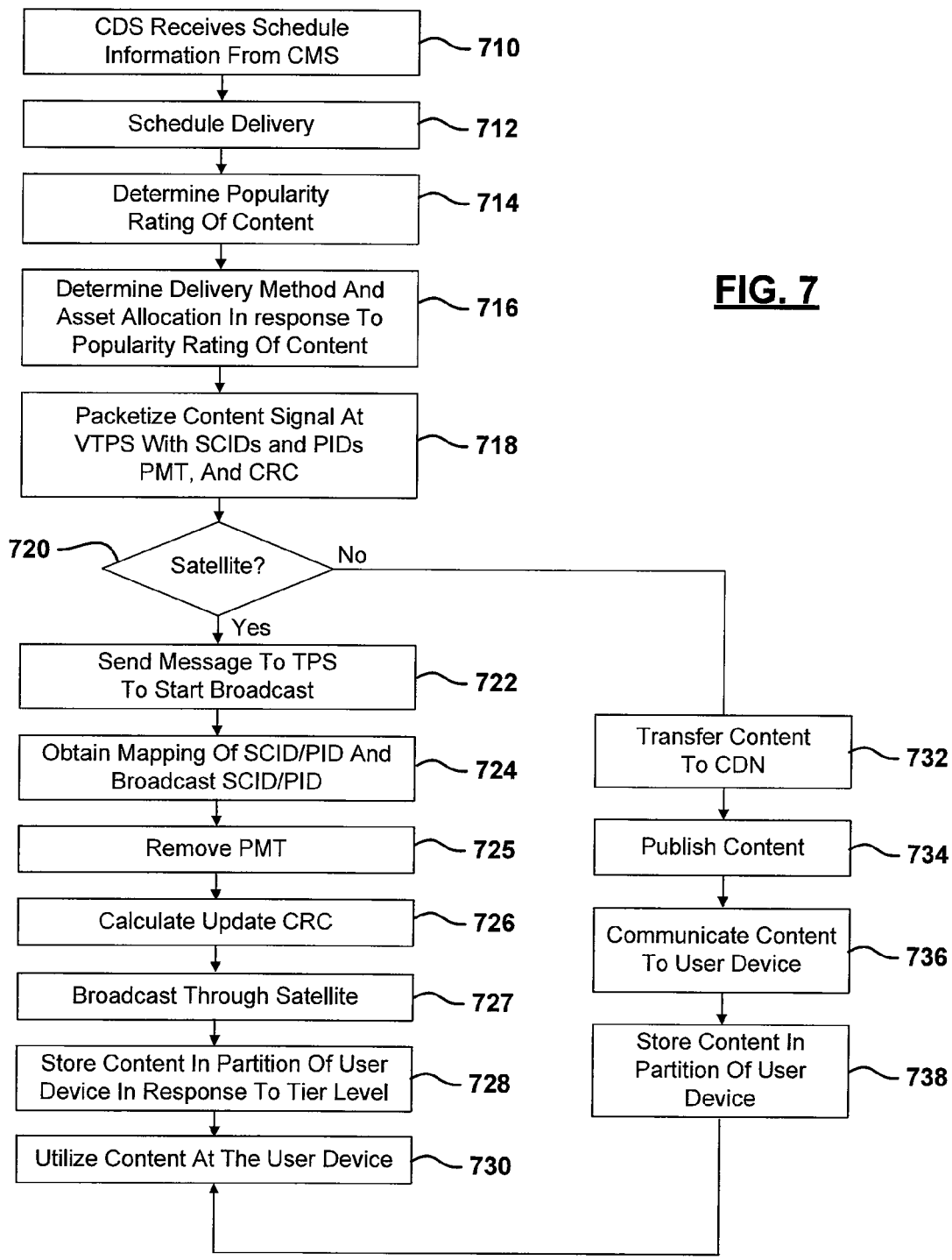
FIG. 7 is a flowchart of a method of transferring content through a satellite or a communication network according to the present disclosure.

Referring now to FIG. 7, the communication system 100 may communicate content through a satellite or through a communication network 132 such as the Internet. The method of FIG. 7 illustrates one way to determine which method may be used. In step 710, the content delivery system receives scheduled information from the content management system 220. In step 712, delivery is scheduled. In step 714, a tier level of the content is determined. The tier level of the content may be determined based upon the popularity of the content. In the following example, three different tiers are used. However, two different tiers corresponding to the satellite and to a terrestrial communication may also be used. In this example, tier one corresponds to pushing contents from the satellite to the user device. The content will be recorded on the network partition of the user device. Tier two corresponds to an "opted-in" contents that are downloaded from the satellite per requests or preferences of the user device. The content is recorded on the user's partition of the customer hard drive. Tier three material or content may consist of less popular contents or niche-appeal contents that appeal to a small audience. The content may be delivered by or through the communication network 132. Contents in tier three category are recorded on the user's partition of the memory device of the user device. Some content may be communicated to the user device upon request (pulled) and some may be "pushed" to the user according to the preferences of the user. In step 716, the delivery method is determined based upon the tier level of the content. In step 718, the content is packetized at the video transport processing system with SCIDs or PIDs, PMT and CRC.

In step 720, it is determined whether or not the tier level corresponds to a satellite. In this example, tier one- and tier two-level contents correspond to the satellite distribution. If satellite distribution is determined based upon the tier level, step 722 sends a message to the transport processing system 250 of FIG. 2 to start a broadcast. In step 724, mapping may be obtained from the content management system. The mapping may be broadcast with the guide data at times other than when the content is transmitted. The content distribution system 260 obtains the mapping and changes the SCIDs or PIDs from the VTPS 223 to broadcast SCIDs or PIDs. In step 725, the program map table (PMT) is removed from the header. In step 726, a new CRC is calculated. In step 727, the content with the broadcast SCID or PIDs and the CRC are broadcast through the satellite. In step 728, content is stored in the partition of the user device in response to the tier level. That is, tier level one contents may be stored on the network partition of the user device whereas tier two contents may be stored in the user's partition of the hard drive or of the user device. In step 730, the contents are utilized at the user device.

Referring back to step 720, if the content or tier level does not correspond to a satellite, step 732 is performed. In step 732, the contents are transferred to a content delivery network. In step 734, the contents are published. In step 736, the contents are communicated to the user device through the communication network 132.

In step 738, the content is stored in the partition of the user device. In this example, the non-satellite material corresponds to tier three. Tier three content is stored in the user's partition of the memory of the user device. After step 738, step 730 is again performed in which the user device utilizes the content.

Figure 8:
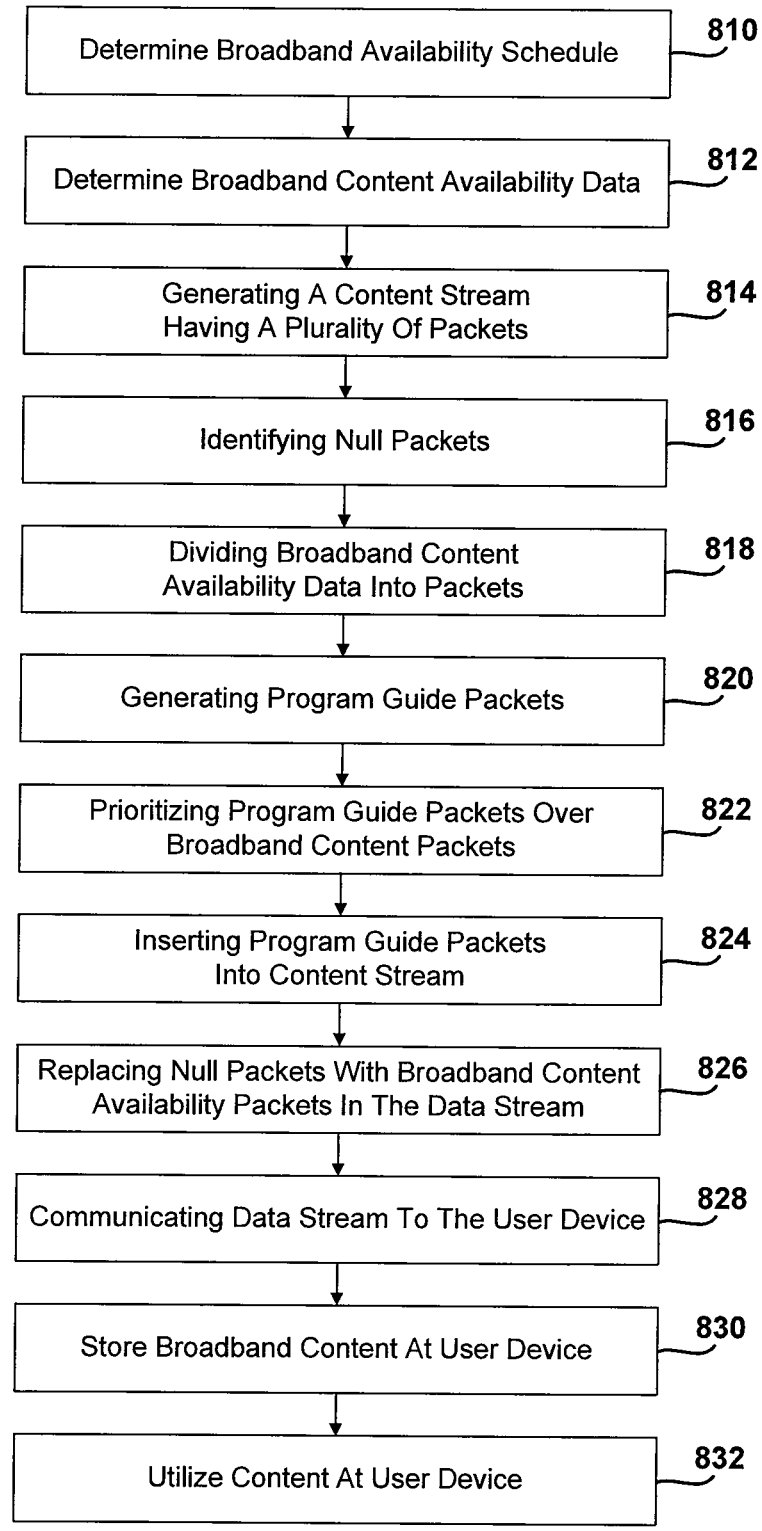
FIG. 8 is a flowchart for communicating broadband availability data through a satellite.

Referring now to FIG. 8, a method of informing users that a particular content is available in the broadband service is set forth. In step 810, broadband availability schedule is determined at the content management system 220. From the broadband availability schedule, broadband content availability data is determined in step 812. In step 814, a content stream having a plurality of packets is generated. The content stream is broadcast over the satellite and contains regularly broadcasted content, including live programs and the like. In step 816, no packets within the content stream are identified prior to transmission. Null packets are commonly used in the content stream. However, the null packets are basically wasted space. As will be described below, the null packets may be substituted with various content packets. In step 818, the broadband content availability data is divided into packets. In step 820, program guide packets may also be formed from program guide information. In step 822, a prioritization may take place between the broadband content availability data packets and the program guide packets. It is likely that programming guide packets may take precedence over the broadband content availability data packets. In step 824, the program guide packets may be inserted into the content stream. If any other null packets are not filled with program guide packets, step 826 replaces null packets with broadband content availability packets in the data stream. In step 828, the data stream is communicated to the user devices. In step 830, the broadband content is stored at the user device. In step 832, the content is utilized at the user device. The content may be utilized by playing back the content and displaying the contents on a display device associated with the user device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
receiving content and metadata in a content processing system from a content provider separate from the content processing system;
processing the content by packetizing, encrypting or both;
after processing, electronically storing the content and the metadata in a content repository under control of a content distribution system of the content processing system;
scheduling a transfer of the content and metadata to a content delivery network;
initiating, by a content management system of a content processing system, transfer of content to the content delivery network;
electronically transferring content and the metadata in an electronic data file under control of the content distribution system from the content repository to the content delivery network within the content processing system based on and prior to a publication start time indicative of when the content file is to be made available to be downloaded by a plurality of user devices from the content delivery network and electronically storing the content in the content delivery network, said content having the publication start time and a purge time associated therewith;
communicating an upload status message to the content distribution system indicative of successful content delivery network upload;
electronically publishing the content from the content delivery network to the plurality of user devices separate from the content delivery network through a communication network in response to the publication start time;
purging the content from the content delivery network at the purge time;
generating a purge status message at the content delivery network; and
after receiving the purge status message at the content distribution system, removing the content from the content repository.

2. A method as recited in claim 1 wherein the metadata comprises the publication start time and the purge time.

3. A method as recited in claim 1 wherein the metadata comprises the publication start time, the purge time and the publication end time.

4. A method as recited in claim 3 wherein purging comprises purging the file after the publication end time.

5. A method as recited in claim 1 wherein the metadata comprises a material identification, the publication start time and a purge time.

6. A method as recited in claim 1 wherein the metadata comprises a material identification, the publication start time, a purge time and a content description.

7. A method as recited in claim 1 further comprising:
storing the content in the user device.

8. A method as recited in claim 1 wherein the user device is a satellite television set top box having a digital video recorder therein.

9. A method as recited in claim 8 wherein storing the content comprises storing the content in the digital video recorder.

10. A method as recited in claim 1 wherein the communication network is a broadband connection.

11. A method as recited in claim 1 wherein the communication network comprises a terrestrial connection.

12. A method as recited in claim 1 wherein the communication network comprises a cable connection.

13. A method as recited in claim 1 wherein the communication network comprises a wireless connection.

14. A method as recited in claim 1 wherein communicating the content is performed after the publication start time and before the purge time.

15. A method as recited in claim 1 wherein communicating the content is performed after the publication start time and before a publication end time.

16. A content processing system in communication with a content provider that is separate from the content processing system comprising:
a content management system receiving metadata for content determining a publication start time and a purge time for content from the metadata, said publication start time indicative of when the content file is to be made available to be downloaded by one or more user devices for the content delivery network;
a transport processing system processing the content from the content provider by packetizing, encrypting or both;

a content distribution system controlling a content repository to store the content from the transport processing system;

said content management system scheduling a transfer of the content and metadata to the content delivery network based on the metadata and initiating transfer for the content to the content delivery network;

said content delivery network communicating with the content repository and receiving content from the content repository; and said content distribution system communicating with the content management system and the content delivery network, said content distribution system initiating transfer of content to the content delivery network from the content repository based on and prior to the publication start time;

said content distribution network communication an upload status message to the content distribution system indicative of successful content delivery network upload;

the content delivery network publishing the content in response to the publication start time;

the content delivery network purging the content at the purge time;

said content delivery network communicating a purge status message to the content distribution system; and said content distribution system, after receiving the purge status message, removing the content from the content repository.

17. A system as recited in claim 16 wherein the metadata comprises the publication start time and the purge time.

18. A system as recited in claim 16 wherein the metadata comprises the publication start time, the purge time and the publication end time.

19. A system as recited in claim 18 wherein the content delivery network purges the content after the publication end time.

20. A system as recited in claim 16 wherein the metadata comprises a material identification, the publication start time and a purge time.

21. A system as recited in claim 16 wherein the metadata comprises a material identification, the publication start time, a purge time and a content description.

22. A system as recited in claim 16 further comprising:
a user device; and
a communication network communicating content from the content delivery network to the user device,
said user device storing the content therein.

23. A system as recited in claim 22 wherein the user device comprises a satellite television set top box having a digital video recorder therein.

24. A system as recited in claim 22 wherein the user device stores the content in the digital video recorder.

25. A system as recited in claim 22 wherein the communication network comprises a broadband connection.

26. A system as recited in claim 22 wherein the communication network comprises a terrestrial connection.

27. A system as recited in claim 22 wherein the communication network comprises a cable connection.

28. A system as recited in claim 22 wherein the communication network comprises a wireless connection.

29. A system as recited in claim 22 wherein the communication network communicates the content after the publication start time and before the purge time.

30. A system as recited in claim 22 wherein the communication network communicates the content after the publication start time and before a publication end time.

* * * * *